(12) United States Patent
Warmoth et al.

(10) Patent No.: US 11,434,083 B2
(45) Date of Patent: Sep. 6, 2022

(54) RECLAIMERS, RECLAIMER SYSTEMS, AND METHODS OF USING SAME

(71) Applicant: BRUKS ROCKWOOD, LLC, Alpharetta, GA (US)

(72) Inventors: Francis J. Warmoth, Kansas City, MO (US); Bengt Axel Nilsson, Atlanta, GA (US); Steven B. Bennett, Alpharetta, GA (US); Matt P. Ervin, Cumming, GA (US)

(73) Assignee: BRUKS ROCKWOOD, LLC, Alpharetta, GA (US)

( * ) Notice: Subject to any disclaimer, the term of this patent is extended or adjusted under 35 U.S.C. 154(b) by 0 days.

(21) Appl. No.: 17/272,821

(22) PCT Filed: Sep. 4, 2019

(86) PCT No.: PCT/US2019/049485
§ 371 (c)(1),
(2) Date: Mar. 2, 2021

(87) PCT Pub. No.: WO2020/051202
PCT Pub. Date: Mar. 12, 2020

(65) Prior Publication Data
US 2021/0316949 A1 Oct. 14, 2021

Related U.S. Application Data

(60) Provisional application No. 62/726,716, filed on Sep. 4, 2018.

(51) Int. Cl.
*B65G 33/08* (2006.01)
*B65G 47/42* (2006.01)
(Continued)

(52) U.S. Cl.
CPC ............. *B65G 47/42* (2013.01); *B65G 33/10* (2013.01); *B65G 65/22* (2013.01); *B65G 65/28* (2013.01); *B65G 2203/0241* (2013.01)

(58) Field of Classification Search
CPC ........ B65G 33/10; B65G 33/14; B65G 33/16; B65G 33/18; B65G 33/20; B65G 65/22;
(Continued)

(56) References Cited

U.S. PATENT DOCUMENTS 2,750,023 A * 6/1956 Meissner ............... B65G 69/10
198/508
3,075,657 A * 1/1963 Hazen ................. A01F 25/2009
414/297
(Continued)

FOREIGN PATENT DOCUMENTS

FR 2 517 285 A2 6/1983
GB 2 012 812 A 8/1979

OTHER PUBLICATIONS

International Search Authority Written Opinion for PCT/US2019/049485 dated Nov. 25, 2019.

*Primary Examiner* — Joseph A Dillon, Jr.
(74) *Attorney, Agent, or Firm* — Ballard Spahr LLP (57) ABSTRACT

Disclosed herein are reclaimer systems, troughs, and methods for selectively positioning at least a portion of an upper portion of a trough relative to a vertical axis to adjust an operative height of the trough and thereby set an overflow threshold height for the reclaimed material, wherein reclaimed material below the overflow threshold height contributes to a target reclaim rate for the reclaimer system, and wherein the trough is configured to permit overflow of reclaimed material above the overflow threshold height.

20 Claims, 6 Drawing Sheets

(51) Int. Cl.
    *B65G 33/10* (2006.01)
    *B65G 65/22* (2006.01)
    *B65G 65/28* (2006.01)

(58) Field of Classification Search
    CPC ...... B65G 65/28; B65G 65/46; B65G 65/466;
                  B65G 2201/04; B65G 2201/042
    USPC ......... 198/550.1, 550.6, 657, 670, 671, 675;
                            414/310, 319, 326; 209/913
    See application file for complete search history.

(56) References Cited

U.S. PATENT DOCUMENTS

| | | | | |
|---|---|---|---|---|
| 3,105,586 | A * | 10/1963 | Carew | A01K 5/0258 198/530 |
| 3,438,517 | A * | 4/1969 | Steffen | B65G 69/00 414/295 |
| 3,456,818 | A * | 7/1969 | Massey | B65G 65/466 414/302 |
| 3,487,961 | A * | 1/1970 | Neuenschwander | B65G 65/466 366/133 |
| 3,604,757 | A * | 9/1971 | White | B65G 65/28 406/39 |
| 3,713,552 | A * | 1/1973 | Schnyder | B65G 65/4854 414/287 |
| 3,765,548 | A * | 10/1973 | Shivvers | B65G 65/466 414/310 |
| 3,847,289 | A * | 11/1974 | Fischer | B65G 65/06 198/519 |
| 4,121,724 | A * | 10/1978 | Fischer | B65G 65/06 198/508 |
| 4,154,332 | A * | 5/1979 | Schlegel | B65G 65/06 198/507 |
| 4,352,426 | A * | 10/1982 | Peterson, Jr. | B65G 33/24 198/671 |
| 4,451,192 | A * | 5/1984 | Wood | B65G 65/466 198/550.4 |
| 4,537,553 | A * | 8/1985 | Andersson | B65G 65/38 198/511 |
| 4,631,125 | A * | 12/1986 | Parks | B01F 13/10 198/560 |
| 4,824,312 | A * | 4/1989 | Schiltz | B65G 65/466 198/668 |
| 4,998,855 | A * | 3/1991 | Tschernatsch | B65G 65/06 198/508 |
| 5,511,925 | A * | 4/1996 | Muth | B65G 65/466 198/550.6 |
| 6,039,647 | A * | 3/2000 | Weikel | B65G 65/466 414/310 |
| 6,095,742 | A * | 8/2000 | Campbell | B65G 65/466 198/493 |
| 6,254,329 | B1 | 7/2001 | Sukup et al. | |
| 7,004,305 | B2 * | 2/2006 | Schaefer | B65G 65/466 198/550.6 |
| 7,101,140 | B2 * | 9/2006 | Jonkka | B65G 3/02 198/519 |
| 7,857,120 | B1 | 12/2010 | Perring et al. | |
| 8,177,053 | B2 * | 5/2012 | Hood | B65G 65/28 198/811 |
| 9,533,840 | B1 * | 1/2017 | Zeilinger | B65G 65/28 |
| 10,160,605 | B1 * | 12/2018 | Foster | B65G 33/10 |
| 10,322,892 | B2 * | 6/2019 | Hoogestraat | B65G 65/466 |
| 10,479,622 | B1 * | 11/2019 | Kaufmann | B65G 65/06 |
| 10,781,063 | B2 * | 9/2020 | Sucre | B65G 53/22 |
| 2008/0302635 | A1 * | 12/2008 | Hood | B65G 65/06 198/493 |
| 2011/0094857 | A1 * | 4/2011 | Kokko | B65G 65/28 198/508 |
| 2014/0021010 | A1 * | 1/2014 | Putman | B65G 33/08 198/359 |
| 2020/0361726 | A1 * | 11/2020 | Olson | B65G 65/466 |
| 2021/0101751 | A1 * | 4/2021 | Walker | B65G 33/14 |

* cited by examiner

Area of Segment

RECLAIMERS, RECLAIMER SYSTEMS, AND METHODS OF USING SAME

CROSS-REFERENCE TO RELATED APPLICATION

This is a U.S. National Phase Application of International Application No. PCT/US2019/049485, filed Sep. 4, 2019, which claims priority to and the benefit of the filing date of U.S. Provisional Patent Application No. 62/726,716, filed Sep. 4, 2018, which applications are incorporated herein by reference in their entireties.

FIELD

The disclosed invention relates to reclaimers, reclaimer systems, and methods of using such reclaimers and reclaimer systems and, more particularly, to systems and methods for regulating material reclaim rates.

BACKGROUND

Reclaimer machines are used for a variety of dry bulk material applications such as, for example and without limitation, stacking, blending, reclaiming, and storing woodchips for bulk material handling and forestry industries. Automated stacking and reclaiming of stockpiles enables the realization of significant reductions in operating costs such as a reduction in power consumption, manpower requirements, and maintenance costs.

There remains a need for improved reclaimers and reclaimer systems that are capable of detecting overflow of excess materials and controlling the effective reclaim rate of the systems. There is a further need for reclaimers and reclaimer systems that facilitate cost-effective installation, minimize structural support requirements, reduce maintenance requirements, and diminish potentially disadvantageous environmental impact.

SUMMARY

Disclosed herein, in various aspects, is a reclaimer system. The reclaimer system can have a selectively travelling (optionally, slewing) reclaimer bridge having a length. The reclaimer system can have a rotatable screw positioned along the length of the reclaimer bridge. The rotatable screw can have a rotation axis, a leading side, a trailing side, an operative circumference, an operative diameter, and a pitch. The rotatable screw can be configured to collect material (optionally, material loosened by a movable harrow) from a pile contacting at least a portion of the selectively travelling reclaimer bridge. The reclaimer system can also have a trough positioned on the trailing side of the rotatable screw. The trough can comprise a fixed lower portion having an inner surface, and an upper portion coupled to the fixed lower portion. At least a portion of the upper portion of the trough can be configured for selective positioning relative to a vertical axis to define an operative height of the trough and thereby set an overflow threshold height for the reclaimed material, with reclaimed material below the overflow threshold height contributing to a target reclaim rate for the reclaimer system and the trough being configured to permit overflow of reclaimed material above the overflow threshold height. Optionally, at least a portion of the upper portion of the trough can be selectively moveable relative to a vertical axis to adjust the operative height of the trough.

Optionally, the system can further comprise at least one overflow detection device configured to detect the presence of material above the selectively moveable portion of the upper portion of the trough. The selectively moveable portion of the upper portion of the trough can include an adjustable baffle plate that has an upper edge and can be movably coupled to another portion of the trough (optionally, movably coupled to the fixed lower portion of the trough). At least one overflow detection device can be configured to detect the presence of material above the upper edge of the baffle plate.

Optionally, each overflow detection device of the at least one overflow detection device can include a target (e.g., a target plate), a contact plate, and an overflow sensor (e.g., a proximity sensor). The target can be secured to the adjustable baffle plate. Optionally, the target can extend upwardly from the adjustable baffle plate. In exemplary aspects, the target can define at least one opening that can be configured to permit passage of material positioned above the upper edge of the baffle plate. The contact plate can be hingedly coupled to the target plate and configured for pivotal movement about a closed position in which at least a portion of the contact plate can be received within or enclose the at least one opening and an open position in which the contact plate is angularly oriented relative to the target plate to permit passage of material through the at least one opening. The contact plate can be biased to the closed position and configured to move toward the open position in response to the material contacting the contact plate. Optionally, the overflow sensor can be configured to detect displacement of the contact plate from the closed position toward the open position.

Methods of using the disclosed reclaimers and reclaimer systems are also described.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein:

FIGS. 3A-3B are cross-sectional side views of an exemplary trough positioned on a trailing side of a rotatable screw and at least one overflow detection device configured to detect the presence of material above a selectively movable portion of an upper edge of the trough, as further disclosed herein. FIG. 3A shows a contact plate of the at least one detection device in a closed position before overflow of material (at a relatively low material level), and FIG. 3B shows the contact plate angularly oriented relative to the target plate in response to overflowing material contacting the contact plate (at a relatively high material level).

FIGS. 4A-4B are close-up perspective views of an exemplary trough positioned on a trailing side of a rotatable screw and having an upper portion that is selectively movable relative to a vertical axis. FIG. 4A shows an adjustable baffle plate of the upper portion in a first position, and FIG. 4B shows the adjustable baffle plate moved to a second, lower (vertical) position.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an", and "the" include plural referents unless the context clearly dictates otherwise. For example, use of the term "an overflow detection device" can refer to one or more of such overflow detection devices.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Figure 1:
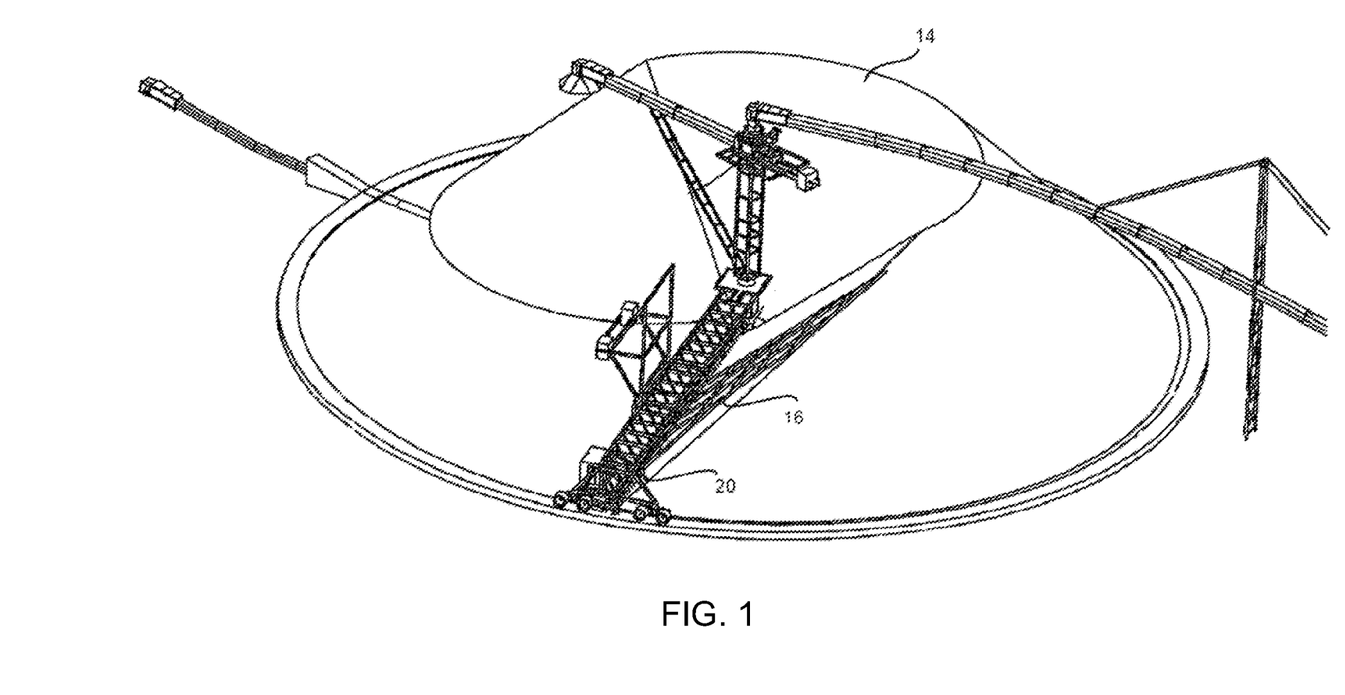
FIG. 1 is a top perspective view of an exemplary reclaimer system, as disclosed herein.
Figure 2:
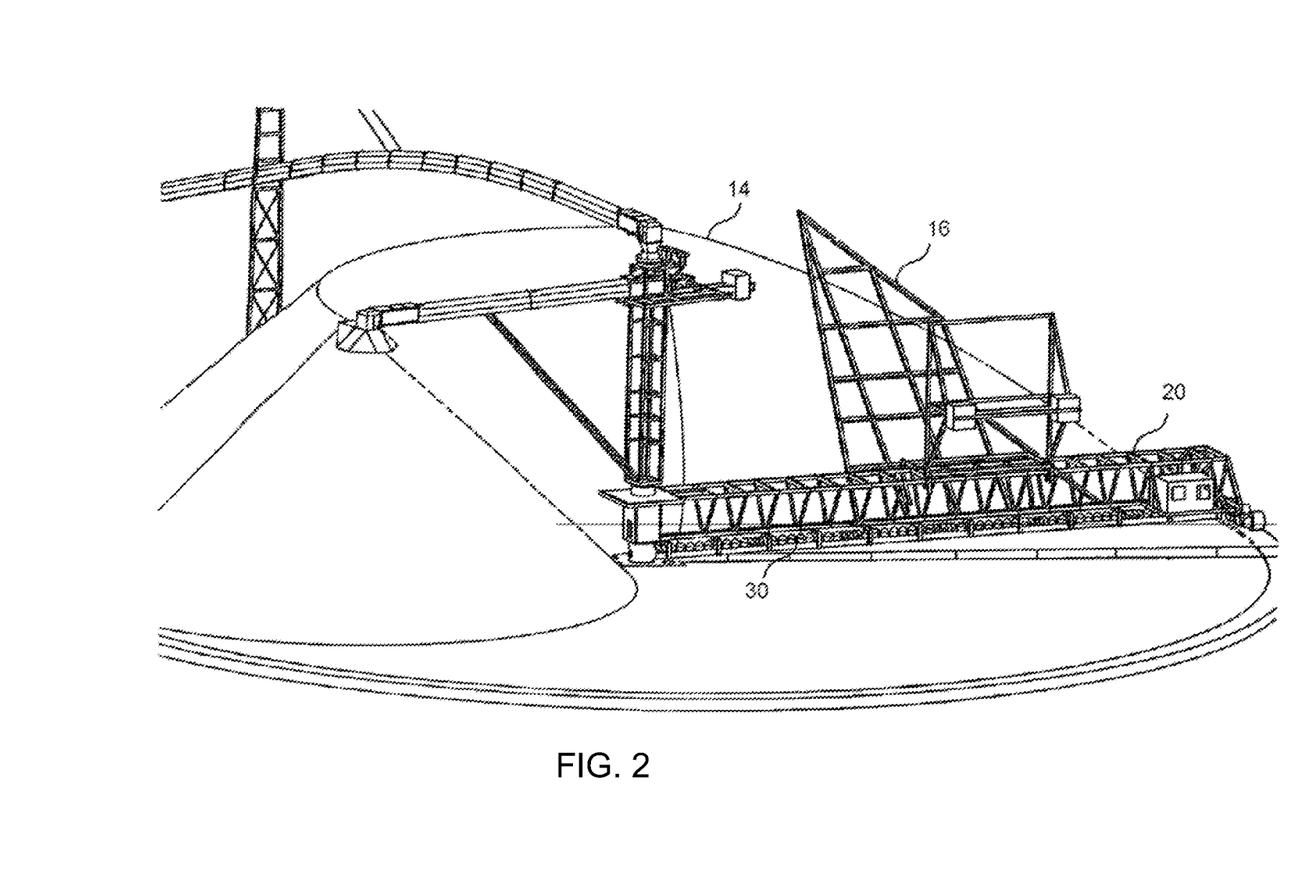
FIG. 2 is another perspective view of the exemplary reclaimer system of FIG. 1.

As depicted in FIGS. 1-2, conventional stacker-reclaimer machines include two functioning parts, a stacker and a reclaimer, which rotate around a central fixed column to form and recover material from a annular pile. A horizontal reclaimer bridge is located at ground level with an outer end of the reclaimer bridge resting on wheeled bogies that ride on a track or rail (optionally, a circular or linear track or rail. The stacker can leave a section of pile clear for the reclaimer, as shown in FIG. 2. Typically, the incoming belt conveys a continuous stream of material to the stacker belt and the stacker discharges the material onto the ground or pile as the stacker rotates slowly around the central column to form the storage pile. As material is needed downstream, the reclaimer recovers stored material. The present disclosure is related to features of this recovery process.

To recover material, as the reclaimer advances, a harrow frame moves along the length of the reclaimer bridge so that its tentacles rake across the surface of the pile to loosen material. The loosened material cascades down the face of the pile to a large diameter horizontal rotating screw that runs the length of the reclaimer bridge. The rotating screw normally requires a trough (e.g., the trailing side or ground beneath the screw) to retain the material in the screw cross section, either as part of the machine, or in some conditions the material itself forms a trough. By preventing the material from moving away from the screw, the material can be impelled along the direction of the screw, and thus, the material is drawn by the rotation of the screw toward the center column where the material is discharged into a circular hopper encased in a vault below ground. The material flows by gravity out of the hopper and onto a belt that conveys the material away to a desired location.

To avoid overloading the downstream processes (i.e., discharge of material into hopper and onto the conveyor belt), material must be reclaimed at a predetermined rate. The reclaim rate can be determined if the rotational speed and the degree of fill of the screw are known. Material flow down the surface of a pile occurs at a natural rate due to gravity and material characteristics. While material characteristics fall within known ranges, most bulk materials are not homogeneous and have characteristics that can change with time (e.g., moisture content). Thus, to accomplish the desired rate, systems having features that are adjustable within the known range of material characteristics are needed. Such adjustable features include the degree of fill in the screw as it rotates and the speed of advance into the pile. In addition to overloading conveyors downstream, inconsistent reclaim rates can overload the screw itself.

Conventional systems, however, lack means for detecting when a desired fill level near a screw discharge has been reached and for controlling the speed of advance into the pile so as to avoid overfilling of the screw and surges of material that must be controlled downstream. Most known devices include a fixed back wall composed of a curved surface and an extended planar upper face, with no means for detecting or regulating the fill level of the screw.

As current stacker-reclaimer systems have limited control over reclaim rates, such systems must employ additional means of metering flow into the downstream processes, resulting in increased equipment, installation, and maintenance costs. For example, in one exemplary application, material from the screw is discharged into a surge hopper whose top flange is below the bottom of the screw. The surge capacity required by wider variations in reclaim rate increases the size of the receiving hopper and deepens the underground vault and tunnel for egress and the reclaim conveyor below the hopper, resulting in a significant additional cost. In another application, flow from the surge hopper must be controlled by metering devices such as plows or screws, further increasing the equipment cost and adding operational complexity.

Disclosed herein, in various aspects and referring to FIGS. 3A-5, are reclaimer systems 10 and troughs 40 designed for controlling the rate at which stored material 12 is reclaimed. As further disclosed herein, conventional reclaimer devices lack means for controlling the reclaim rate of material 12 as required by downstream processes. As a reclaimer advances into a pile 14 of material 12, the material (e.g., woodchips, coal) cascades down the surface of the pile. The rate of advance necessary to achieve the desired fill level of a rotatable screw (e.g., a selectively rotatable screw), as further disclosed herein, is established during commissioning, but variabilities in the stored material affect the reclaim rate. Inconsistent bulk density, changing moisture content, random particle size distribution, and other factors influence reclaim rate, which needs to be consistent within (predefined and selectively adjustable) limits. In various aspects, to accomplish the desired rate, the systems 10 and troughs 40 disclosed herein are designed with certain features that can be adjustable within the known range of material characteristics. For example, in one aspect, reclaim rate can be measured downstream by a device such as a belt scale, and the reclaimer can maintain the reclaim rate by increasing or decreasing the advance of the reclaimer into the pile 14. When mass flow rate falls below desired limits, the reclaimer can receive a signal to advance faster. The disclosed systems, troughs, and methods can also prevent the reclaimer from advancing too fast, causing damage to itself and damaging or overloading the reclaimer system.

The principles of conveying with screws depend on screw diameter and pitch, rotational speed, and the percentage of screw cross-section filled with material, all of which affect conveying rate. Described herein are methods of detecting and controlling the fill rate of the screw, which ultimately determines the effective reclaim rate of the disclosed systems. Conventional screw conveyors normally require a trough to retain the material in the screw cross section, either as part of the machine, or in some conditions the material itself forms a trough. Only by preventing the material from moving away from the screw can the material be impelled along the direction of the screw. While the advancing side of the screw and the underlying ground can act as a trough, without something to retain material on the trailing side, the material will flow over and under the screw without being moved effectively toward the discharge end of the screw (e.g., the discharge hopper).

Many competing machines have a fixed back wall composed of a curved surface and extended planar upper face, but there is no means to detect fill level. The design fill level can be less than 100%, but without a means of regulation, the material can completely fill the screw, creating surges that must be controlled downstream. Some other known devices require additional means of metering flow into the downstream processes such as use of a hopper and metering screws. The present disclosure eliminates the need for the hopper and metering screws. As further disclosed herein, and in contrast to conventional reclaimer systems, the troughs disclosed herein can allow for an immediate or substantially immediate or real-time response (e.g., within 15, 10, 5, 3, 2, or 1 second) to reclaim rate adjusting operating parameters as required to maintain a consistent material reclaim rate, thereby acting as a safety device for the overall system.

As further disclosed herein, an in contrast to conventional reclaimer systems, it is contemplated that the disclosed troughs and reclaimer systems, which prevent overflow, can be used in linear reclaim applications. It is further contemplated that linear reclaim volume can be maximized by using a reclaimer attacking each end of a pile, as opposed to a single reclaim trapped between two piles. Thus, the disclosed troughs can be used in a single reclaimer machine or in a plurality of reclaimer machines that cooperate to achieve a desired reclaim rate. For example, it is contemplated that the disclosed troughs and reclaimer systems can be used with a large single screw or with two or more smaller reclaimer machines to achieve a desired reclaim rate. It is still further contemplated that the disclosed troughs and reclaimer systems are capable of achieving higher effective material reclaim rates than conventional reclaimer systems.

It is contemplated that the disclosed reclaimer systems and troughs can be incorporated into any screw-driven reclaimer system such as, for example, Circular Blending Systems, which are designed for continuous stacking of materials in one ring-shaped pile, as shown in FIG. 2.

Exemplary Reclaimer Systems

Figure 3A:
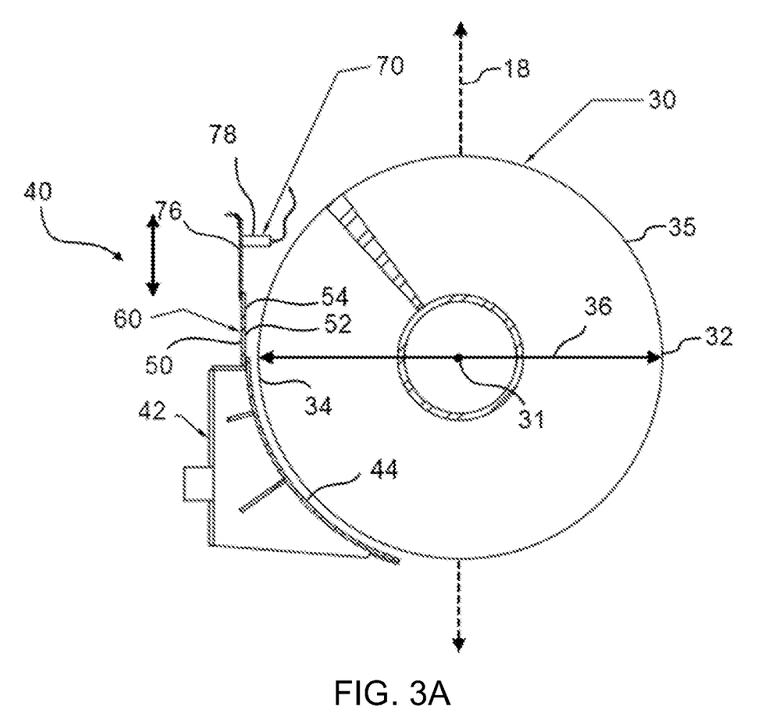

In exemplary aspects, and with reference to FIGS. 3A-5, the reclaimer system 10 can include a selectively travelling reclaimer bridge 20 having a length. As used herein, the term "travelling" can include slewing (in the case of circular reclaimer bridges) or linear travel (in the case of linear reclaimer bridges). The reclaimer system 10 also can have a rotatable screw 30 positioned along the length of the reclaimer bridge 20. The rotatable screw 30 can have a rotation axis 31, a leading side 32, a trailing side 34, an operative circumference 35, an operative diameter 36, and a pitch, as shown in FIG. 3A. Optionally, the rotatable screw 30 can be configured to collect material 12 (optionally, material loosened by a movable harrow 16) from a pile 14 contacting at least a portion of the selectively travelling reclaimer bridge 20 (e.g., a central column of the reclaimer bridge). The general structure and functioning of the travelling reclaimer bridge 20 and the movable harrow 16 are well-known and established and, as such, will not be described in detail herein. Although the material may be reclaimed after loosening by a movable harrow 16, it is contemplated that other conventional means for agitating and loosening the material can be employed. It is further contemplated that the material can optionally be a free-flowing material, for which no agitation or loosening is required.

In still a further aspect, the reclaimer system 10 can include a trough 40 positioned on the trailing side 34 of the rotatable screw 30. In this aspect, it is contemplated that the trough 40 can begin at a hopper and have a selected length moving along the length of the screw 30. In exemplary aspects, the trough 40 can comprise a fixed lower portion 42 having an inner surface 44, and an upper portion 60 coupled to the fixed lower portion 42. More generally, it is contemplated that the upper portion 60 of the trough 40 can be coupled to any other portion of the trough. In use, at least a portion of the upper portion of the trough can be configured for selective positioning (optionally, selective movement) relative to a vertical axis to define an operative height of the trough and thereby set an overflow threshold height for the reclaimed material, with reclaimed material below the overflow threshold height contributing to a target reclaim rate for the reclaimer system and the trough being configured to permit overflow of reclaimed material above the overflow threshold height. Optionally, at least a portion of the upper portion 60 of the trough 40 can be selectively moveable relative to a vertical axis 18 to adjust an operative height 43 of the trough 40 and thereby adjust the overflow threshold height of the reclaimed material. However, in some exemplary aspects, the upper portion of the trough need not be selectively moveable relative to the fixed lower portion. In these aspects, it is contemplated that the overall height of the trough can be fixed, such that the overflow threshold height is also fixed. As used herein, the term "material reclaim rate" refers to the rate at which bulk material 12 moved from a storage pile 14 is recovered by the rotatable screw 30 and then delivered to the discharge end of the screw for downstream processing.

In exemplary aspects, it is contemplated that the selectively moveable portion of the upper portion 60 of the trough 40 can be manually adjusted (e.g., using selectively removable fasteners and vertically spaced attachment locations) or adjusted in an automated manner as further disclosed herein. It is contemplated that the selectively movable portion of the upper portion 60 of the trough 40 can extend to a discharge end of the trough 40. It is further contemplated that the selectively movable portion of the upper portion 60 of the trough 40 can begin proximate a hopper and extend along a selected length of the trough.

Figure 3B:
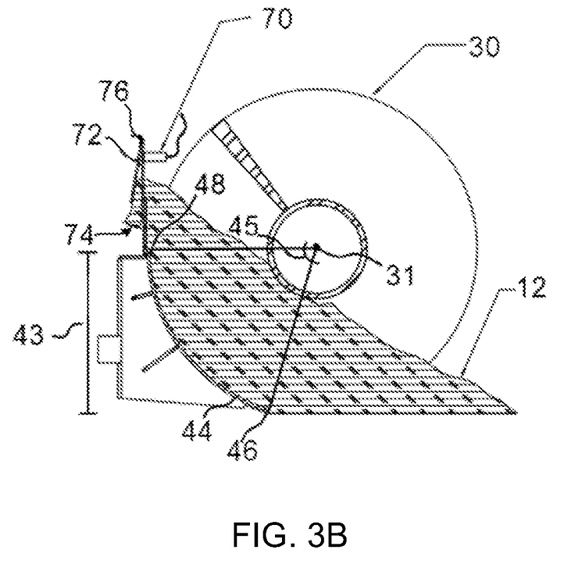
Figure 3C:
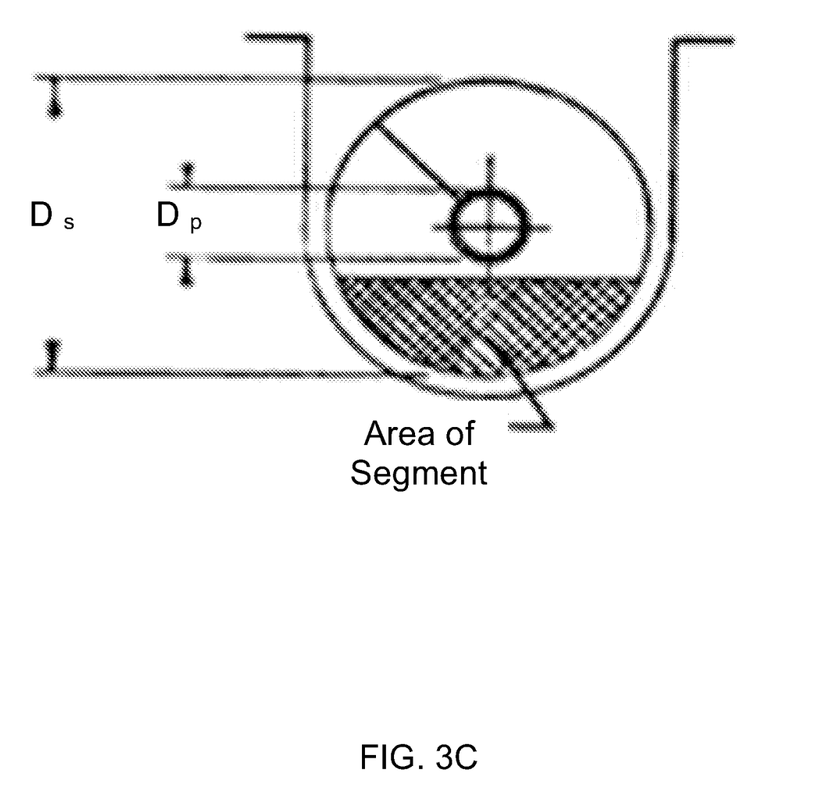
FIG. 3C is a cross-sectional side schematic view depicting a screw diameter, a pipe diameter, and an area of a segment as disclosed herein.

In further aspects, as shown in FIG. 3B, it is contemplated that the fixed lower portion 42 of the trough 40 can have a height 43 relative to the vertical axis 18 that is less than the operative diameter 36 of the rotatable screw 30. The inner surface 44 of the fixed lower portion 42 can have a lower edge 46 and an upper edge 48. As shown in FIG. 3B, from the lower edge 46 to the upper edge 48 of the inner surface 44 of the fixed lower portion 42, the inner surface of the fixed lower portion can subtend an angle 45 ranging from about 45° to about 170° measured with respect to the rotation axis 31 of the screw 30. In some exemplary aspects, angle 45 can range from about 45° to about 90°. Optionally, the angle 45 subtended by the inner surface 44 of the fixed lower portion 42 of the trough 40 can vary along a length of the trough 40. For example, in some aspects, the angle 45 subtended by the inner surface 44 of the fixed lower portion 42 can be greater towards the discharge end of the screw than it is at positions that are closer to the opposing receiving/input end of the screw. Optionally, the angle 45 of the trough can have a consistent (linear) increase as the trough approaches the discharge end of the screw. Optionally, in some aspects, the trough can comprise a plurality of sequential trough sections that are coupled together to form the trough. Optionally, in these aspects, it is contemplated that each trough section can have the same angle 45. Alternatively, it is contemplated that at least one trough section can have a different angle 45 than at least one other trough section that forms the trough.

In further exemplary aspects, and as shown in FIGS. 3A-5, the stacker-reclaimer system 10 or, more particularly, the trough 40 can comprise at least one overflow detection device 70 configured to detect the presence of material 12 above the selectively moveable portion 50 of the upper portion 60 of the trough 40. Optionally, in some aspects, the at least one overflow detection device 70 can comprise a plurality of overflow detection devices spaced along a length of the selectively moveable portion 50 of the upper portion 60 of the trough 40, as shown in FIGS. 4A-4B. In these exemplary aspects, it is contemplated that the at least one overflow detection device 70 can comprise at least one overflow sensor 78. Optionally, in some aspects, the at least one overflow detection device 70 can comprise a proximity sensor, a pressure sensor, a flow sensor, or combinations thereof. It is contemplated that any conventional sensor for directly or indirectly measuring proximity, pressure, or flow can be used within the disclosed system 10. Particular examples of sensors that are suitable for this purpose are well known in the art and will not be described in detail herein.

In additional aspects, the selectively moveable portion 50 of the upper portion 60 of the trough 40 can comprise an adjustable baffle plate 52 that has an upper edge 54 and is movably coupled to another portion of the trough 40 (optionally, movably coupled to the fixed lower portion 42 of the trough 40) such that the baffle plate is selectively moveable relative to the vertical axis 18. In these aspects, the at least one overflow detection device 70 can be configured to detect the presence of material 12 above the upper edge 54 of the baffle plate 52.

Optionally, in various aspects, the vertical location of the selectively moveable portion 50 of the upper portion 60 of the trough 40 can be manually adjusted. In these aspects, it is contemplated that the vertical location of the selectively moveable portion 50 can be adjusted using a plurality of pin holes that are located at various vertical locations along the height of the trough and that are configured to receive pins or other fasteners to selectively secure the selectively moveable portion 50. In other aspects, the vertical location of the selectively moveable portion 50 of the upper portion 60 of the trough 40 can be adjusted using a winch or hydraulic-assist cylinder that are operatively coupled to the selectively moveable portion 50. In these aspects, it is contemplated that the winch can be hand-operated to permit manual operation. Alternatively, it is contemplated that the winch and/or the hydraulic-assist cylinder can be operated in an automated manner. In still further aspects, the vertical location of the selectively moveable portion 50 can be adjusted in an automated manner using an actuator (e.g., a hydraulic cylinder) as further disclosed herein.

Figure 4A:
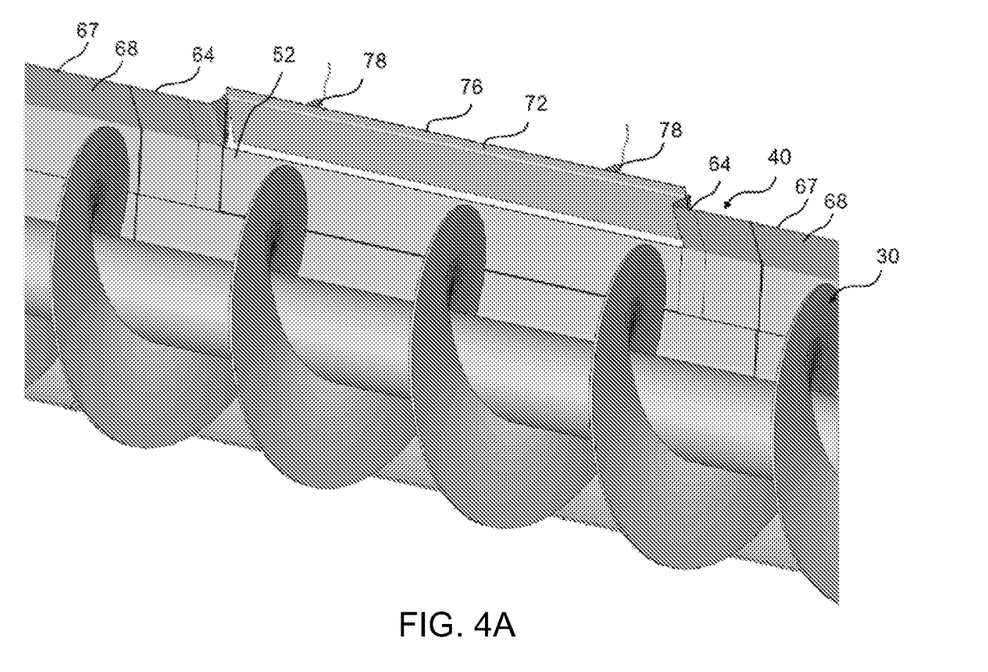
Figure 4B:
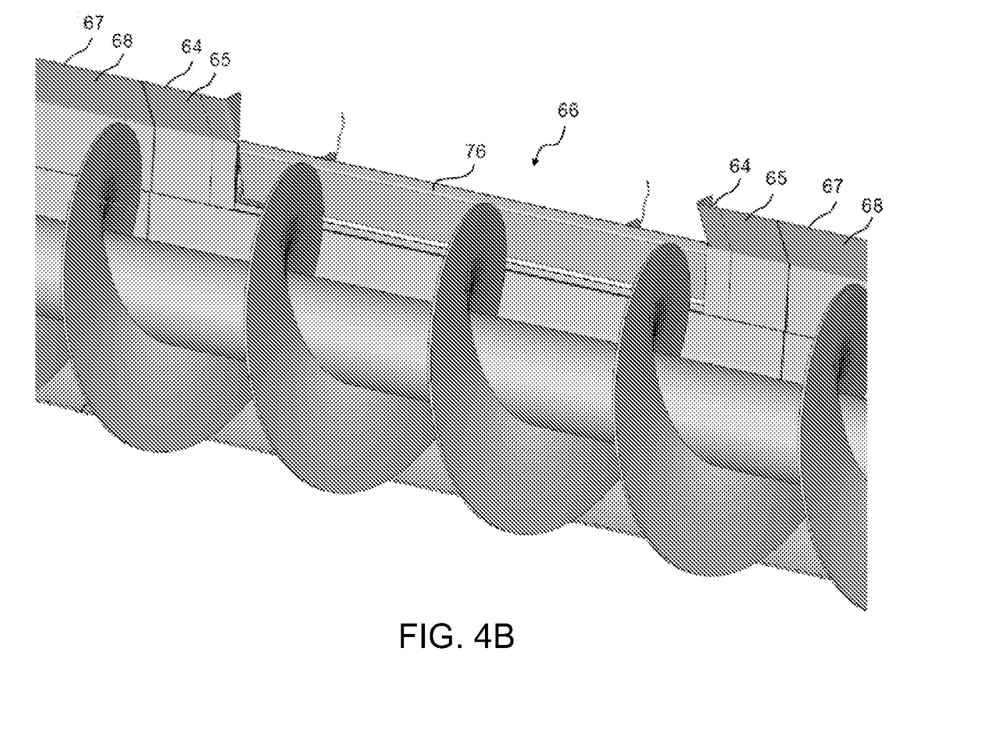

Optionally, as set forth above, the trough 40 can comprise a plurality of sequential trough sections that are coupled together to form the trough. In exemplary aspects, and as shown in FIGS. 4A-4B, trough sections 64 provided with a selectively moveable portion 50 can have a different structure than adjacent trough sections, which may not have a selectively moveable portion. For example, whereas some trough sections 67 may have a fixed upper portion 68 that extends upwardly from the fixed lower portion 42 at a fixed height, the trough sections 64 provided with the selectively moveable portion 50 have a selectively adjustable height. Optionally, the trough sections 64 provided with a selectively moveable portion 50 can have upper wall portions 65 that cooperate with an upper surface of the fixed lower portion 42 to define a cutout or recessed portion 66 within which the selectively moveable portion 50 and the overflow detection device 70 are at least partially received. In these aspects, the upper wall portions 65 can have a fixed operative height that matches the fixed height of the trough sections 67 having a fixed upper portion 68.

Optionally, in exemplary aspects, each overflow detection device 70 of the at least one overflow detection device 70 can comprise a target 72, a contact plate 76, and an overflow sensor 78. In these aspects, the target 72 can be secured to (and, optionally, extend upwardly from) the adjustable baffle plate 52. The target can define at least one opening 74 that is configured to permit passage of material 12 positioned above the upper edge 54 of the baffle plate 52. Optionally, the target 72 can comprise a target plate as depicted in the Figures. Alternatively, it is contemplated that the target 72 can be defined by a portion of the upper portion of the trough such that a separate plate is unnecessary. Still further, it is contemplated that the target can be eliminated from the overflow detection device 70; for example, in exemplary aspects, the overflow sensor 78 of the overflow detection device 70 can comprise a linear encoder (e.g., an optical linear encoder) or other sensor that is capable of directly detecting the presence (e.g., height) of material without using a portion of the trough as a target.

The contact plate 76 can be hingedly coupled to the target 72 and configured for pivotal movement about a closed position in which at least a portion of the contact plate 76 is received within the at least one opening 74 (see FIG. 3A) and an open position in which the contact plate 76 is angularly oriented relative to the target plate 72 to permit passage of material 12 through the at least one opening 74 (see FIG. 3B). The contact plate 76 can be biased to the closed position and configured to move toward the open position in response to the material 12 contacting the contact plate 76. The overflow sensor 78 can be configured to detect displacement of the contact plate 76 from the closed position toward the open position. It is understood that the sensitivity and other detection parameters of the overflow sensor 78 can be selectively adjusted depending upon a particular trough structure.

Figure 5:
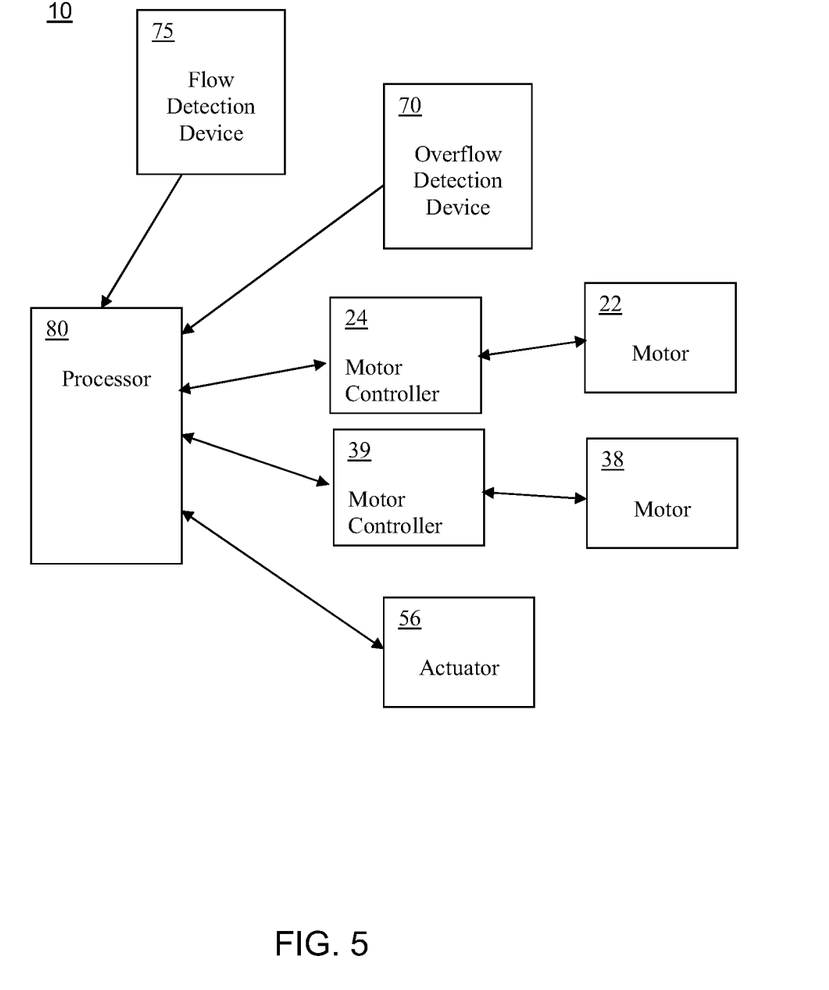
FIG. 5 is a schematic diagram of an exemplary reclaimer system, as disclosed herein.

In further exemplary aspects, and as shown in FIG. 5, the reclaimer system 10 can further comprise a processor 80 communicatively coupled to the at least one overflow detection device 70. In these aspects, it is contemplated that the processor 80 can be provided as a component of a computing device, such as a programmable logic controller, a desktop computer, a laptop computer, a tablet, a smartphone, or a cloud-based computing device as are known in the art. Optionally, the processor 80 can be in communication with a memory or database (provided locally or remotely through a network, such as a cloud-based network) that can store operational protocols and parameter settings to be accessed by the processor. In further aspects, the processor 80 can be in communication with a user interface that allows for selective operator control of the selectively travelling reclaimer bridge 20, the rotatable screw 30, and the trough 40 within the system 10.

In still further exemplary aspects, and as shown in FIG. 5, the processor 80 can be communicatively coupled to at least one flow detection device 75 that is configured to measure an amount of material flowing within or through the system. Examples of flow detection devices 75 that can be provided at one or more locations within the system 10 include, without limitation, a weight scale, a mass flow detection device, a volumetric measurement device (e.g., an optical volumetric measurement device), and the like. In exemplary aspects, it is contemplated that the at least one flow detection device 75 can be positioned downstream of the overflow detection device 70 and configured to produce an output indicative of the quantity of material exiting the discharge end of the system.

In exemplary aspects, the at least one overflow detection device 70 can be configured to produce an output indicative of a material reclaim rate. The material reclaim rate depends on the rotational speed and the degree of fill of the rotatable screw 30, as further disclosed herein. Optionally, the material reclaim rate can be calculated using a standard CEMA (Conveyor Equipment Manufacturers Association) formula, modified as appropriate to account for specific trough modifications and other factors. One exemplary CEMA formula that can be employed is:

$$\frac{C}{rpm} = 0.7854 \frac{(D_s^2 - D_p^2)PK60}{1728},$$

where:
C=cubic feet per hour
rpm=revolutions of screw per minute
$D_s$=diameter of screw (inches)
$D_p$=diameter of pipe (inches)
P=pitch of screw (inches)
K=percent trough loading.

In exemplary aspects, the processor 80 can be configured to receive the outputs from the at least one overflow detection device 70 and/or the at least one flow detection device 75 to selectively adjust the rotational speed of the rotatable screw 30 and/or an advance rate of the selectively travelling reclaimer bridge 20 to maintain or achieve a desired material reclaim rate. It is contemplated that the rotational speed of the rotatable screw 30 can be controlled by variable speed drives to increase or decrease the rotational speed as is known in the art. It is further contemplated that the speed of advance into the pile 14 can be controlled by means of variable frequency drives, which can be adjusted during machine commissioning to reclaim at the desired material reclaim rate based on the material characteristics in storage at the time. Variations in the speed of advance can effectively control the degree of fill in the screw 30 as the screw rotates.

Optionally, in some aspects, and with reference to FIG. 5, the selectively travelling reclaimer bridge 20 and the rotatable screw 30 can each be driven by respective motors or drives 22, 38, respectively. In these aspects, the processor 80 can be communicatively coupled to the motors or drives 22, 38 of the selectively travelling reclaimer bridge 20 and the rotatable screw 30, respectively. Optionally, it is contemplated that the disclosed motors can be coupled to the reclaimer bridge and the rotatable screw using gearboxes as are known in the art. Optionally, the reclaimer bridge 20 can be operatively coupled to one or more motors 22 and driven slowly along a selected pathway (e.g., a linear or circular pathway) to advance into the pile. When a circular pathway is used, the reclaimer bridge 20 can rotate around a central column, with a far end of the reclaimer bridge travelling on a circular track or path, which can be made of concrete or compacted material or include a rail. When a linear pathway is used, the reclaimer bridge can travel on a rail. Optionally, in exemplary aspects, the motor 22 can be communicatively coupled to a motor controller 24, which can include hardware and processing circuitry corresponding to a motor starter and/or variable-frequency drive (VFD). It is contemplated that the motor starter can be configured to selectively stop operation of the motor 22 in response to receipt of an input received by the processor 80 (e.g., from an overflow detection device) that is indicative of an overflow condition. It is further contemplated that the motor starter can be configured to ensure the motor 22 remains in an "off" status until the overflow condition is no longer present (based upon continued feedback to the processor from the overflow detection device or by other manual input). Similarly, it is contemplated that the variable-frequency drive can be configured to stop operation of the motor 22 and/or reduce the speed of the motor in response to receipt of an input received by the processor 80 (e.g., from an overflow detection device) that is indicative of an overflow condition. It is further contemplated that the variable-frequency drive can be configured to ensure the motor 22 remains in an "off" status or at a reduced operational speed until the overflow condition is no longer present (based upon continued feedback to the processor from the overflow detection device or by other manual input). Optionally, it is further contemplated that a similar motor controller 39 can be provided for motor 38 to selectively control operation of the rotatable screw 30. Although shown separate from processor 80, it is contemplated that motor controllers 24, 39 can alternatively be provided as processing components or processing unit of processor 80. Thus, it is understood that the processor is communicatively or operatively coupled to the motors 22, 38 either directly or through respective motor controllers 24, 39.

In response to the determined material reclaim rate (i.e., receiving the output from the at least one overflow detection device 70), the processor 80 can be configured to compare the determined material reclaim rate to a material reclaim rate setpoint and to adjust at least one of a rotation speed of the rotatable screw 30 and an advance rate of the selectively travelling reclaimer bridge 20 as needed to achieve the material reclaim rate setpoint. As further disclosed herein, such adjustment can optionally include inactivation (a stoppage of movement) or a reduction in speed of movement of at least one of the reclaimer bridge 20 and the rotatable screw 30.

In additional aspects, and as further disclosed herein, at least one actuator 56 can be operatively coupled to the selectively movable portion(s) of the upper portion 60 of the trough 40 and configured to effect adjustment of the operative height 43 of the trough 40. In these aspects, the processor 80 can be communicatively coupled to the at least one actuator 56, and in response to the determined material reclaim rate, the processor 80 can be configured to compare the determined material reclaim rate to a material reclaim rate setpoint and to adjust the operative height 43 of the trough 40 as needed to achieve the material reclaim rate setpoint. It is contemplated that the adjustment of the operative height 43 of the trough 40 can be effected by the processor in conjunction with adjustment of at least one of a rotation speed of the rotatable screw 30 and an advance rate of the selectively travelling reclaimer bridge 20 to achieve the material reclaim rate setpoint. It is contemplated that the actuator 56 can comprise any conventional linear actuator or lift or drive assembly for effecting movement of an object relative to a vertical axis. For example, in some aspects, the actuator 56 can comprise a hydraulic cylinder. In other aspects, the actuator can comprise a driven winch assembly as is known in the art.

In use, the rotatable screw 30 can be used to collect loose material 12 (e.g., material loosened by the movable harrow 16) from the pile 14 contacted by at least a portion of the selectively travelling reclaimer bridge 20. As described herein, the rotatable screw 30 can be positioned along the length of the reclaimer bridge 20. The trough 40 can be positioned on the trailing side 34 of the rotatable screw 30, and at least the portion of the upper portion 60 of the trough 40 can be positioned (optionally, moved) relative to the vertical axis 18 to adjust the operative height 43 of the trough 40, thereby setting an overflow threshold height for the reclaimed material, with reclaimed material below the overflow threshold height contributing to a target reclaim rate for the reclaimer system and the trough being configured to permit overflow of reclaimed material above the overflow threshold height. In exemplary aspects, the disclosed processor 80 can be used to receive an output (optionally, a plurality of outputs) from the at least one overflow detection device 70 indicative of a material 12 reclaim rate. In these aspects, the processor 80 can be communicatively coupled to motors 22, 38 of the selectively travelling reclaimer bridge 20 and the rotatable screw 30, to the actuator 56 of the selectively movable portion 50 of the upper portion 60 of the trough 40, and to a flow measurement device (e.g., a scale or volumetric flow measurement device) as further disclosed herein. The processor 80 can be used to compare the determined material reclaim rate to a material reclaim rate setpoint. Following the comparison, the processor 80 can selectively adjust at least one of the following parameters as needed to achieve the material reclaim rate setpoint: (a) a rotation speed of the rotatable screw 30; (b) an advance rate of the selectively travelling reclaimer bridge 20; and (c) the operative height 43 of the trough 40. More generally, it is contemplated that the processor 80 can automatically adjust operational parameters as needed to control the advancement of the reclaimer bridge into the material pile. It is contemplated that the disclosed reclaimer system 10 can provide several advantages over conventional systems and methods, including without limitation, simplifying manufacturing, installation, and maintenance by eliminating the need for equipment such as hoppers and metering devices; facilitating cost-effective operational costs by reducing the amount of materials wasted as a result of spillage over troughs; diminishing potentially disadvantageous environmental impact such as unsightly debris; facilitating the safe operation of the reclaimer system and associated equipment while providing a consistent reclaim rate; and allowing excess material to flow over the trough and then be collected on subsequent passes of the equipment, thereby avoiding waste.

Exemplary Aspects

In view of the described systems and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A reclaimer system comprising: a selectively travelling reclaimer bridge having a length; a rotatable screw positioned along the length of the reclaimer bridge, the rotatable screw having a rotation axis, a leading side, a trailing side, an operative circumference, and an operative diameter, the rotatable screw being configured to collect material reclaimed by a movable harrow from a pile contacting at least a portion of the selectively travelling reclaimer bridge; and a trough positioned on the trailing side of the rotatable screw, wherein the trough comprises an upper portion, wherein at least a portion of the upper portion of the trough is configured for selective positioning relative to a vertical axis to define an operative height of the trough and thereby set an overflow threshold height for the reclaimed material collected by the screw, wherein reclaimed material below the overflow threshold height contributes to a target reclaim rate for the reclaimer system, and wherein the trough is configured to permit overflow of reclaimed material above the overflow threshold height.

Aspect 2: The reclaimer system of aspect 1, wherein the upper portion of the trough comprises a selectively moveable portion that is selectively moveable relative to the vertical axis, the reclaimer system further comprising at least one overflow detection device configured to detect the presence of material above the selectively moveable portion of the upper portion of the trough.

Aspect 3: The reclaimer system of aspect 2, wherein the selectively moveable portion of the upper portion of the trough comprises an adjustable baffle plate that has an upper edge and is movably coupled to another portion of the trough, wherein the at least one overflow detection device is configured to detect the presence of material above the upper edge of the baffle plate.

Aspect 4: The reclaimer system of aspect 2 or aspect 3, wherein the at least one overflow detection device comprises a plurality of overflow detection devices spaced along a length of the selectively moveable portion of the upper portion of the trough.

Aspect 5: The reclaimer system of any one of aspects 2-4, wherein the at least one overflow detection device comprises at least one overflow sensor.

Aspect 6: The reclaimer system of any one of aspects 3-5, wherein each overflow detection device of the at least one overflow detection device comprises: a target secured to the adjustable baffle plate, wherein the target plate defines at least one opening that is configured to permit passage of material positioned above the upper edge of the baffle plate; and a contact plate hingedly coupled to the target plate and configured for pivotal movement about a closed position in which at least a portion of the contact plate is received within the at least one opening and an open position in which the contact plate is angularly oriented relative to the target plate to permit passage of material through the at least one opening; and an overflow sensor, wherein the contact plate is biased to the closed position, wherein the contact plate is configured to move toward the open position in response to the material contacting the contact plate, and wherein the overflow sensor is configured to detect displacement of the contact plate from the closed position toward the open position.

Aspect 7: The reclaimer system of any one of the preceding aspects, wherein the selectively movable portion of the upper portion of the trough extends to a discharge end of the trough.

Aspect 8: The reclaimer system of any one of the preceding aspects, wherein the trough further comprises a fixed lower portion coupled to the upper portion of the trough, wherein the fixed lower portion of the trough has a height relative to the vertical axis that is less than the operative diameter of the rotatable screw, wherein the inner surface of the fixed lower portion has a lower edge and an upper edge, and wherein, from the lower edge to the upper edge of the inner surface of the fixed lower portion, the inner surface of the fixed lower portion subtends an angle ranging from about 45° to about 170° measured with respect to the rotation axis of the screw.

Aspect 9: The reclaimer system of aspect 8, wherein the angle subtended by the inner surface of the fixed lower portion of the trough varies along a length of the trough.

Aspect 10: The reclaimer system of any one of aspects 2-9, further comprising: at least one flow detection device positioned downstream from the at least one overflow detection device; and a processor communicatively coupled to the at least one overflow detection device, wherein the at least one flow detection device is configured to produce an output indicative of a material reclaim rate, wherein the at least one flow detection device is configured to produce an output indicative of a quantity of material discharged from a discharge end of the trough, and wherein the processor is configured to receive the outputs from the at least one overflow detection device and the at least one flow detection device.

Aspect 11: The reclaimer system of aspect 10, further comprising a motor of the rotatable screw and a motor of the selectively travelling reclaimer bridge, wherein the processor is communicatively coupled to the motors of the rotatable screw and the selectively travelling reclaimer bridge, wherein, in response to the determined material reclaim rate, the processor is configured to compare the determined material reclaim rate to a material reclaim rate setpoint and to adjust at least one of a rotation speed of the rotatable screw and an advance rate of the selectively travelling reclaimer bridge as needed to achieve the material reclaim rate setpoint.

Aspect 12: The reclaimer system of aspect 10, further comprising at least one actuator that is operatively coupled to the selectively movable portion of the upper portion of the trough and configured to effect adjustment of the operative height of the trough, wherein the processor is communicatively coupled to the at least one actuator, and wherein, in response to the determined material reclaim rate, the processor is configured to compare the determined material reclaim rate to a material reclaim rate setpoint and to adjust the operative height of the trough as needed to achieve the material reclaim rate setpoint.

Aspect 13: A trough for use in a reclaimer system having a selectively travelling reclaimer bridge and a rotatable screw positioned along a length of the selectively travelling reclaimer bridge, the rotatable screw being configured to collect material reclaimed by a movable harrow from a pile contacting at least a portion of the selectively travelling reclaimer bridge, the trough being configured for positioning on a trailing side of the rotatable screw and comprising: a fixed lower portion having an inner surface; and an upper portion coupled to the fixed lower portion, wherein at least a portion of the upper portion is configured for selective positioning relative to a vertical axis to adjust an operative height of the trough and thereby set an overflow threshold height of reclaimed material collected by the screw, wherein reclaimed material below the overflow threshold height contributes to a target reclaim rate for the reclaimer system, and wherein the trough is configured to permit overflow of reclaimed material above the overflow threshold height.

Aspect 14: The trough of aspect 13, wherein the upper portion of the trough comprises a selectively moveable portion that is selectively moveable relative to the vertical axis, the trough further comprising at least one overflow detection device configured to detect the presence of material above the selectively moveable portion of the upper portion of the trough.

Aspect 15: The trough of aspect 14, wherein the selectively moveable portion of the upper portion of the trough comprises an adjustable baffle plate that has an upper edge and is movably coupled to another portion of the trough, wherein the at least one overflow detection device is configured to detect the presence of material above the upper edge of the baffle plate.

Aspect 16: The trough of aspect 14 or aspect 15, wherein the at least one overflow detection device comprises a plurality of overflow detection devices spaced along a length of the selectively moveable portion of the upper portion of the trough.

Aspect 17: The trough of any one of aspects 14-16, wherein the at least one overflow detection device comprises at least one overflow sensor.

Aspect 18: The trough of any one of aspects 15-17, wherein each overflow detection device of the at least one overflow detection device comprises: a target that is secured to the adjustable baffle plate, wherein the target defines at least one condition that is configured to permit passage of material positioned above the upper edge of the baffle plate; and a contact plate hingedly coupled to the target plate and configured for pivotal movement about a closed position in which at least a portion of the contact plate is received within the at least one opening and an open position in which the contact plate is angularly oriented relative to the target plate to permit passage of material through the at least one opening; and an overflow sensor, wherein the contact plate is biased to the closed position, wherein the contact plate is configured to move toward the open position in response to the material contacting the contact plate, and wherein the overflow sensor is configured to detect displacement of the contact plate from the closed position toward the open position.

Aspect 19: A method comprising: using a rotatable screw to collect material from a pile contacting at least a portion of a selectively travelling reclaimer bridge, the rotatable screw being positioned along a length of the reclaimer bridge, the rotatable screw having a rotation axis, a leading side, a trailing side, an operative circumference, and an operative diameter; positioning a trough on a trailing side of the rotatable screw, wherein the trough comprises an upper portion; and selectively positioning at least a portion of the upper portion of the trough relative to a vertical axis to adjust an operative height of the trough and thereby set an overflow threshold height of reclaimed material collected by the screw, wherein reclaimed material below the overflow threshold height contributes to a target reclaim rate for the reclaimer system, and wherein the trough is configured to permit overflow of reclaimed material above the overflow threshold height.

Aspect 20: The method of aspect 19, further comprising: using at least one overflow detection device to detect the presence of material above the selectively moveable portion of the upper portion of the trough; using a processor to receive an output from the at least one overflow detection device indicative of a material reclaim rate; and using the processor to receive an output from at least one flow detection device indicative of a quantity of material discharged from a discharge end of the trough, the processor being communicatively coupled to motors of the rotatable screw and the selectively travelling reclaimer bridge and to an actuator of a selectively movable portion of the upper portion of the trough; using the processor to compare the determined material reclaim rate to a material reclaim rate setpoint; and using the processor to selectively adjust at least one of the following parameters as needed to achieve the material reclaim rate setpoint: a rotation speed of the rotatable screw; an advance rate of the selectively travelling reclaimer bridge; and the operative height of the trough.

Although the foregoing invention has been described in some detail by way of illustration and example for purposes of clarity of understanding, certain changes and modifications may be practiced within the scope of the appended claims.

What is claimed is:

1. A reclaimer system comprising:
   a selectively travelling reclaimer bridge having a length;
   a rotatable screw positioned along the length of the reclaimer bridge, the rotatable screw having a rotation axis, a leading side, a trailing side, an operative circumference, and an operative diameter, the rotatable screw being configured to collect material reclaimed from a pile contacting at least a portion of the selectively travelling reclaimer bridge; and
   a trough positioned on the trailing side of the rotatable screw, wherein the trough comprises an upper portion,
   wherein at least a portion of the upper portion of the trough is configured for selective positioning relative to a vertical axis to define an operative height of the trough and thereby set an overflow threshold height for reclaimed material collected by the screw, wherein reclaimed material below the overflow threshold height contributes to a target reclaim rate for the reclaimer system, and wherein the trough is configured to permit overflow of reclaimed material above the overflow threshold height, and
   wherein the upper portion of the trough comprises a selectively moveable portion that is selectively moveable relative to the vertical axis, the reclaimer system further comprising at least one overflow detection device configured to detect the presence of material above the selectively moveable portion of the upper portion of the trough.

2. The reclaimer system of claim 1, wherein the selectively moveable portion of the upper portion of the trough comprises an adjustable baffle plate that has an upper edge and is movably coupled to another portion of the trough, wherein the at least one overflow detection device is configured to detect the presence of material above the upper edge of the baffle plate.

3. The reclaimer system of claim 1, wherein the at least one overflow detection device comprises a plurality of overflow detection devices spaced along a length of the selectively moveable portion of the upper portion of the trough.

4. The reclaimer system of claim 1, wherein the at least one overflow detection device comprises at least one overflow sensor.

5. The reclaimer system of claim 2, wherein each overflow detection device of the at least one overflow detection device comprises:
   a target secured to the adjustable baffle plate, wherein the target defines at least one opening that is configured to permit passage of material positioned above the upper edge of the baffle plate; and
   a contact plate hingedly coupled to the target and configured for pivotal movement about a closed position in which at least a portion of the contact plate is received within the at least one opening and an open position in which the contact plate is angularly oriented relative to the target to permit passage of material through the at least one opening; and
   an overflow sensor,
   wherein the contact plate is biased to the closed position, wherein the contact plate is configured to move toward the open position in response to the material contacting the contact plate, and wherein the overflow sensor is configured to detect displacement of the contact plate from the closed position toward the open position.

6. The reclaimer system of claim 1, wherein the selectively movable portion of the upper portion of the trough extends to a discharge end of the trough.

7. The reclaimer system of claim 1, wherein the trough further comprises a fixed lower portion coupled to the upper portion of the trough, wherein the fixed lower portion of the trough has a height relative to the vertical axis that is less than the operative diameter of the rotatable screw, wherein the inner surface of the fixed lower portion has a lower edge and an upper edge, and wherein, from the lower edge to the upper edge of the inner surface of the fixed lower portion, the inner surface of the fixed lower portion subtends an angle ranging from about 45° to about 170° measured with respect to the rotation axis of the screw.

8. The reclaimer system of claim 7, wherein the angle subtended by the inner surface of the fixed lower portion of the trough varies along a length of the trough.

9. The reclaimer system of claim 1, further comprising:
at least one flow detection device positioned downstream from the at least one overflow detection device; and
a processor communicatively coupled to the at least one overflow detection device, wherein the at least one overflow detection device is configured to produce an output indicative of a material reclaim rate, wherein the at least one flow detection device is configured to produce an output indicative of a quantity of material discharged from a discharge end of the trough, and wherein the processor is configured to receive the outputs from the at least one overflow detection device and the at least one flow detection device.

10. The reclaimer system of claim 9, further comprising a motor of the rotatable screw and a motor of the selectively travelling reclaimer bridge, wherein the processor is communicatively coupled to the motors of the rotatable screw and the selectively travelling reclaimer bridge, wherein, in response to the determined material reclaim rate, the processor is configured to compare the determined material reclaim rate to a material reclaim rate setpoint and to adjust at least one of a rotation speed of the rotatable screw and an advance rate of the selectively travelling reclaimer bridge as needed to achieve the material reclaim rate setpoint.

11. The reclaimer system of claim 9, further comprising at least one actuator that is operatively coupled to the selectively movable portion of the upper portion of the trough and configured to effect adjustment of the operative height of the trough, wherein the processor is communicatively coupled to the at least one actuator, and wherein, in response to the determined material reclaim rate, the processor is configured to compare the determined material reclaim rate to a material reclaim rate setpoint and to adjust the operative height of the trough as needed to achieve the material reclaim rate setpoint.

12. A trough for use in a reclaimer system having a selectively travelling reclaimer bridge and a rotatable screw positioned along a length of the selectively travelling reclaimer bridge, the rotatable screw being configured to collect material reclaimed from a pile contacting at least a portion of the selectively travelling reclaimer bridge, the trough being configured for positioning on a trailing side of the rotatable screw and comprising:
a fixed lower portion having an inner surface; and
an upper portion coupled to the fixed lower portion,
wherein at least a portion of the upper portion is configured for selective positioning relative to a vertical axis to adjust an operative height of the trough and thereby set an overflow threshold height for reclaimed material collected by the screw, wherein reclaimed material below the overflow threshold height contributes to a target reclaim rate for the reclaimer system, and wherein the trough is configured to permit overflow of reclaimed material above the overflow threshold height, and
wherein the upper portion comprises a selectively moveable portion that is selectively moveable relative to the vertical axis, the trough further comprising at least one overflow detection device configured to detect the presence of material above the selectively moveable portion of the upper portion of the trough.

13. The trough of claim 12, wherein the selectively moveable portion of the upper portion of the trough comprises an adjustable baffle plate that has an upper edge and is movably coupled to another portion of the trough, wherein the at least one overflow detection device is configured to detect the presence of material above the upper edge of the baffle plate.

14. The trough of claim 12, wherein the at least one overflow detection device comprises a plurality of overflow detection devices spaced along a length of the selectively moveable portion of the upper portion of the trough.

15. The trough of claim 12, wherein the at least one overflow detection device comprises at least one overflow sensor.

16. The trough of claim 13, wherein each overflow detection device of the at least one overflow detection device comprises:
a target secured to the adjustable baffle plate, wherein the target defines at least one opening that is configured to permit passage of material positioned above the upper edge of the baffle plate; and
a contact plate hingedly coupled to the target and configured for pivotal movement about a closed position in which at least a portion of the contact plate is received within the at least one opening and an open position in which the contact plate is angularly oriented relative to the target to permit passage of material through the at least one opening; and
an overflow sensor,
wherein the contact plate is biased to the closed position, wherein the contact plate is configured to move toward the open position in response to the material contacting the contact plate, and wherein the overflow sensor is configured to detect displacement of the contact plate from the closed position toward the open position.

17. A method comprising:
using a rotatable screw to collect material reclaimed from a pile contacting at least a portion of a selectively travelling reclaimer bridge, the rotatable screw being positioned along a length of the reclaimer bridge, the rotatable screw having a rotation axis, a leading side, a trailing side, an operative circumference, and an operative diameter;
positioning a trough on a trailing side of the rotatable screw, wherein the trough comprises an upper portion; and
selectively positioning at least a portion of the upper portion of the trough relative to a vertical axis to adjust an operative height of the trough and thereby set an overflow threshold height for the reclaimed material collected by the screw, wherein reclaimed material below the overflow threshold height contributes to a target reclaim rate for the reclaimer system, and wherein the trough is configured to permit overflow of reclaimed material above the overflow threshold height;

detecting, using at least one overflow detection device, a presence of material above a selectively moveable portion of the upper portion of the trough;

receiving, by a processor an output from the at least one overflow detection device indicative of the material reclaim rate; and receiving, by the processor, an output from at least one flow detection device indicative of a quantity of material discharged from a discharge end of the trough, the processor being communicatively coupled to motors of the rotatable screw and the selectively travelling reclaimer bridge and to an actuator of the selectively movable portion of the upper portion of the trough;

comparing, by the processor, the determined material reclaim rate to a material reclaim rate setpoint; and selectively adjusting, by the processor, at least one of the following parameters as needed to achieve the material reclaim rate setpoint:

(a) a rotation speed of the rotatable screw;
(b) an advance rate of the selectively travelling reclaimer bridge; or
(c) the operative height of the trough.

18. The method of claim 17, wherein the trough comprises a fixed lower portion having an inner surface, and wherein the upper portion of the trough is coupled to the fixed lower portion.

19. The method of claim 18, wherein the fixed lower portion of the trough has a height relative to the vertical axis that is less than the operative diameter of the rotatable screw, wherein the inner surface of the fixed lower portion has a lower edge and an upper edge, and wherein, from the lower edge to the upper edge of the inner surface of the fixed lower portion, the inner surface of the fixed lower portion subtends an angle ranging from about 45° to about 170° measured with respect to the rotation axis of the screw.

20. The method of claim 19, wherein the angle subtended by the inner surface of the fixed lower portion of the trough varies along a length of the trough.

* * * * *